US00RE48623E

(19) United States
(12) Reissued Patent
Schmidt et al.

(10) Patent Number: US RE48,623 E
(45) **Date of Reissued Patent: *Jul. 6, 2021**

(54) VISCOUS CLUTCH WITH RETURN BORE THROUGH ROTOR

(71) Applicant: Horton, Inc., Roseville, MN (US)

(72) Inventors: Thomas Schmidt, St. Paul, MN (US); Bastian Brand, Schonungen (DE); Scott Miller, Edina, MN (US)

(73) Assignee: HORTON, INC., Roseville, MN (US)

( * ) Notice: This patent is subject to a terminal disclaimer.

(21) Appl. No.: 16/364,473

(22) Filed: Mar. 26, 2019

Related U.S. Patent Documents

Reissue of:
(64) Patent No.: 9,624,988
Issued: Apr. 18, 2017
Appl. No.: 14/428,255
PCT Filed: Sep. 20, 2013
PCT No.: PCT/US2013/060889
§ 371 (c)(1),
(2) Date: Mar. 13, 2015
PCT Pub. No.: WO2014/047430
PCT Pub. Date: Mar. 27, 2014

U.S. Applications:
(60) Provisional application No. 61/704,457, filed on Sep. 22, 2012.

(51) Int. Cl.
*F16D 35/00* (2006.01)
*F16H 47/00* (2006.01)
(Continued)

(52) U.S. Cl.
CPC ..... *F16D 35/024* (2013.01); *F16D 35/00* (2013.01); *F16D 35/005* (2013.01); *F16H 47/00* (2013.01);
(Continued)

(58) Field of Classification Search
CPC ..... F16D 35/005; F16D 35/024; F16D 2300/0212; F16D 2027/05; F16D 2027/07; F16H 47/065
See application file for complete search history.

(56) References Cited

U.S. PATENT DOCUMENTS 3,211,136 A 10/1965 Burckhardt et al.
3,403,764 A 10/1968 Sutaruk
(Continued)

FOREIGN PATENT DOCUMENTS

DE 3941834 A1 6/1991
DE 102012216337 A1 3/2013
(Continued)

OTHER PUBLICATIONS

Japanese Office Action for corresponding JP application No. 2015-533216, dated Jan. 4, 2017, 4 pages.
(Continued)

*Primary Examiner* — Peter C English
(74) *Attorney, Agent, or Firm* — Westman, Champlin & Koehler, P. A.

(57) ABSTRACT

A viscous clutch (20) includes a housing assembly (28), a rotor assembly (26), a reservoir (38) to hold a supply of a shear fluid, a working chamber (40) operatively positioned between the housing assembly and the rotor assembly, and a fluid return bore (26-1B) that optionally extends radially through at least an outer diameter portion of the rotor assembly to the working chamber. Selective introduction of the shear fluid to the working chamber facilitates selective torque transmission between the housing assembly and the rotor assembly. The fluid return bore can form at least a portion of a fluid return path (50) from the working chamber to the reservoir.

17 Claims, 7 Drawing Sheets

(51) Int. Cl.
*F16H 47/06* (2006.01)
*F16D 35/02* (2006.01)

(52) U.S. Cl.
CPC ... *F16H 47/065* (2013.01); *F16D 2300/0212* (2013.01)

(56) References Cited

U.S. PATENT DOCUMENTS 3,444,748 A 5/1969 Sutaruk
3,552,532 A 1/1971 Thomas et al.
3,741,359 A 6/1973 Leichliter
3,893,555 A 7/1975 Elmer
3,921,772 A 11/1975 Hayashi et al.
4,046,239 A 9/1977 Tinholt
4,056,178 A 11/1977 Detty
4,086,988 A 5/1978 Spence
4,086,989 A 5/1978 Spence
4,132,299 A 1/1979 Rohrer et al.
4,190,140 A 2/1980 Konkle et al.
RE30,428 E 11/1980 Detty
4,256,257 A 3/1981 Pinkerton
4,281,750 A 8/1981 Clancey
4,346,797 A 8/1982 Bopp
4,351,425 A 9/1982 Bopp
4,405,039 A 9/1983 Hauser
4,441,599 A 4/1984 Storz
4,446,952 A 5/1984 Masai
4,526,257 A 7/1985 Mueller
4,548,223 A 10/1985 Kirkbride
4,564,093 A * 1/1986 Storz ..... F16D 35/022 192/58.681
4,592,456 A 6/1986 Neugebauer
4,633,988 A 1/1987 Light
4,665,694 A 5/1987 Brunken
4,667,791 A 5/1987 Martin et al.
4,667,792 A 5/1987 Hauser
4,699,258 A 10/1987 Johnston et al.
4,828,088 A 5/1989 Mohan et al.
4,850,465 A 7/1989 Ono
4,860,862 A 8/1989 Yater et al.
4,874,071 A 10/1989 White
4,898,266 A 2/1990 Garrett et al.
4,898,267 A 2/1990 Garrett et al.
4,924,985 A 5/1990 Kennedy
4,924,987 A 5/1990 Kennedy
4,938,329 A 7/1990 Kennedy
4,940,121 A 7/1990 Digele
4,977,990 A 12/1990 Mader
4,987,986 A 1/1991 Kennedy et al.
4,995,494 A * 2/1991 Kennedy et al. ..... F16D 35/023 192/58.682
5,022,507 A 6/1991 Kennedy et al.
5,113,987 A 5/1992 Drennen et al.
5,156,247 A 10/1992 Wiese et al.
5,190,131 A 3/1993 Hagiwara
5,199,539 A 4/1993 Kikuchi
5,484,045 A 1/1996 Kikuchi et al.
5,501,010 A 3/1996 Scott
5,511,643 A 4/1996 Brown
5,593,283 A 1/1997 Scott
5,601,170 A 2/1997 Martin et al.
5,722,523 A 3/1998 Martin
5,855,265 A 1/1999 Kennedy
5,992,594 A 11/1999 Herrle et al.
5,996,755 A 12/1999 Burke
6,021,747 A 2/2000 Gee et al.
6,026,943 A 2/2000 Fuchs et al.
6,032,775 A * 3/2000 Martin ..... F16D 35/021 192/113.21
6,102,177 A 8/2000 Moser et al.
6,206,639 B1 3/2001 Light et al.
6,358,010 B2 3/2002 Light et al.
6,408,621 B1 6/2002 Moser et al.
6,419,064 B1 7/2002 Krammer
6,443,283 B1 9/2002 Augenstein et al.
6,520,382 B2 2/2003 Estelle et al.
6,530,462 B2 3/2003 Lutz
6,530,748 B2 3/2003 Light et al.
6,550,596 B2 4/2003 Shiozaki et al.
6,605,015 B1 * 8/2003 Kinsley et al. ..... F16D 25/0638 192/103 F
6,732,845 B2 5/2004 Tilly et al.
6,752,251 B2 6/2004 May et al.
6,868,809 B1 3/2005 Robb
6,894,883 B2 5/2005 Buchholz
6,935,478 B2 8/2005 Drager et al.
7,013,859 B2 3/2006 Linnig
7,044,282 B2 5/2006 Saunders, III
7,083,032 B2 8/2006 Boyer
7,278,524 B2 10/2007 Boyer
7,581,627 B2 9/2009 McDermott et al.
7,650,974 B2 1/2010 Light et al.
7,828,529 B2 11/2010 Baumgartner et al.
7,854,307 B2 12/2010 Hennessy et al.
7,913,826 B2 3/2011 Boyer
7,938,240 B2 5/2011 Hennessy et al.
7,946,400 B2 5/2011 Hennessy et al.
7,954,616 B2 6/2011 Buchholz
7,963,380 B2 6/2011 Light et al.
8,100,241 B2 1/2012 Hennessy et al.
8,186,494 B2 5/2012 Boyer
2002/0104732 A1 8/2002 Ciavaglia et al.
2004/0110594 A1 * 6/2004 Goto ..... F16D 41/088 475/150
2004/0124057 A1 7/2004 Shiozaki et al.
2004/0214679 A1 10/2004 Younger
2005/0045443 A1 3/2005 Tilly
2005/0196297 A1 * 9/2005 Baumgartner ..... F01P 5/12 417/364
2005/0263365 A1 12/2005 Barnum et al.
2006/0021843 A1 2/2006 Saunders
2006/0042902 A1 3/2006 Boyer
2006/0243553 A1 11/2006 Light et al.
2006/0243554 A1 11/2006 May
2006/0243817 A1 11/2006 Light et al.
2007/0119677 A1 5/2007 Barnum et al.
2008/0023288 A1 1/2008 Boyer
2008/0023289 A1 1/2008 Boyer
2009/0084650 A1 4/2009 Hennessy et al.
2009/0127051 A1 5/2009 Buchholz
2010/0044602 A1 2/2010 Boyer
2010/0059325 A1 3/2010 Boyer
2010/0122885 A1 5/2010 Light et al.
2011/0168512 A1 7/2011 May
2011/0209676 A1 9/2011 Malott, Jr. et al.
2011/0220452 A1 9/2011 Roby, Jr.
2011/0229323 A1 9/2011 Roby
2011/0266111 A1 11/2011 Boyer
2012/0090949 A1 4/2012 Rothoff et al.
2012/0107145 A1 5/2012 Roby
2012/0138409 A1 6/2012 Buchholz et al.
2012/0164002 A1 6/2012 Roczniak et al.
2013/0134008 A1 5/2013 Boyer
2013/0299300 A1 11/2013 Pickelman, Jr. et al.

FOREIGN PATENT DOCUMENTS

EP 1045162 A2 10/2000
EP 1674752 A1 6/2006
EP 1757832 A2 2/2007
EP 2284414 B1 8/2009
EP 2487380 A1 8/2012
JP 02-096035 U 7/1990
JP 04-194423 A 7/1992
JP H05-71745 A 3/1993
JP H11-270593 A 10/1999
JP 2004286048 A 10/2004
JP 2006-275110 A 10/2006
JP 2008-082490 A 4/2008
JP 2009-063079 A 3/2009
JP 2009228884 A 10/2009
JP 2010031968 A 2/2010
JP 2013-511016 A 3/2013
WO WO01/14759 A1 3/2001

(56) References Cited

FOREIGN PATENT DOCUMENTS

| | | | |
|---|---|---|---|
| WO | WO2004/051107 | A2 | 6/2004 |
| WO | WO2011/019527 | A2 | 2/2011 |
| WO | WO2011/062856 | A2 | 5/2011 |
| WO | WO2012/024497 | A2 | 2/2012 |
| WO | WO2012/112283 | A2 | 8/2012 |

OTHER PUBLICATIONS

Notification of Reasons for Refusal in counterpart Japanese Patent Application No. 2016-170729 dated Jul. 7, 2017 (4 pages).
International Search Report and Written Opinion from PCT Application Serial No. PCT/US2013/060889, dated Dec. 17, 2013, 13 pages.
Extended European Search Report for EP Application No. 15178814.4, dated Jan. 4, 2016, 7 pages.

* cited by examiner

VISCOUS CLUTCH WITH RETURN BORE THROUGH ROTOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The present invention relates to clutches, and more particularly to viscous clutches.

Viscous clutches are used in a wide variety of automotive applications, such as to drive fans, pumps and the like, as well as in other contexts. These clutches typically employ relatively thick silicone oil (generally called shear fluid or viscous fluid) for the selective transmission of torque between two rotatable components. It is possible to engage or disengage the clutch by selectively allowing the oil into and out of a working area of the clutch located between input and output members. In a typical viscous clutch, the rotational input is a rotor disk connected to a drive shaft or pulley, and the rotational output is a housing or cover that can be connected to a fan, pump, shaft or other output element. A valve is used to control the flow of the oil through the working area between the input and the output. It has become common for the clutch to be controlled electrically. This has been done to increase the controllability of the clutch, and to also have the clutch capable of responding to multiple cooling needs in a vehicle, such as to respond to coolant temperature, intake air temperature, air conditioning pressure, and/or oil temperature.

Viscous clutches have been used in the past as a separate device installed on a rotating pulley on the engine front. Rotational inputs to the clutch have been traditionally been engine crankshafts and water pumps. During the past decade, cooling requirements have been increasing as a result of increasingly stringent engine emission reduction requirements. During this time, the use of a belted pulley has become a more common method of providing an input to the fan clutch, with the belted pulley (synonymously called a sheave) capable of increasing the fan speed in order to obtain more cooling air flow for a vehicle's heat exchanger(s). The belted drive is desirable due to its simplicity, low cost and ease of obtaining desired rotational speed. Due to the rotational input to the fan clutch being separated from the water pump or crankshaft, it is possible for the cooling system engineer to choose the exact fan speed required to provide the necessary and desired cooling for a given application.

Examples of viscous clutches include those disclosed in commonly-assigned U.S. Pat. No. 7,938,240 and PCT Published Applications WO 2011/062856A3 and WO 2012/024497A3. Further examples of viscous clutches include those disclosed in U.S. Pat. Nos. 4,046,239; 6,419,064 and 7,828,529, in U.S. Published Pat. App. No. 2012/0164002, and in European Published Patent Application No. EP 2 487 380 A1.

It is therefore desired to provide an alternative clutch design that is suitable for use with relatively high input speeds and torque loads, has relatively low mass, and provides relatively good heat dissipation, among other possible features and benefits. In addition, or in the alternative, it is desired to provide an alternative clutch design that is adaptable to a variety of applications without the need for extensive customization and whole-clutch re-design, among other possible features and benefits.

SUMMARY

In one aspect, a viscous clutch includes a housing assembly, a rotor assembly, a reservoir to hold a supply of a shear fluid, a working chamber operatively positioned between the housing assembly and the rotor assembly, and a fluid return bore that optionally extends radially through at least an outer diameter portion of the rotor assembly to the working chamber. Selective introduction of the shear fluid to the working chamber facilitates selective torque transmission between the housing assembly and the rotor assembly. The fluid return bore can form at least a portion of a fluid return path from the working chamber to the reservoir.

In another aspect, considered either in addition to or in the alternative to the first aspect, a viscous clutch includes a housing assembly, a rotor assembly, a reservoir to hold a supply of a shear fluid, a working chamber operatively positioned between the housing assembly and the rotor assembly, wherein selective introduction of the shear fluid to the working chamber facilitates selective torque transmission between the housing assembly and the rotor assembly, and a pump bore insert having a bore in fluid communication with a fluid return path extending from the working chamber to the reservoir.

Persons of ordinary skill in the art will recognize that other aspects and embodiments of the present invention are possible.

Figure 1:
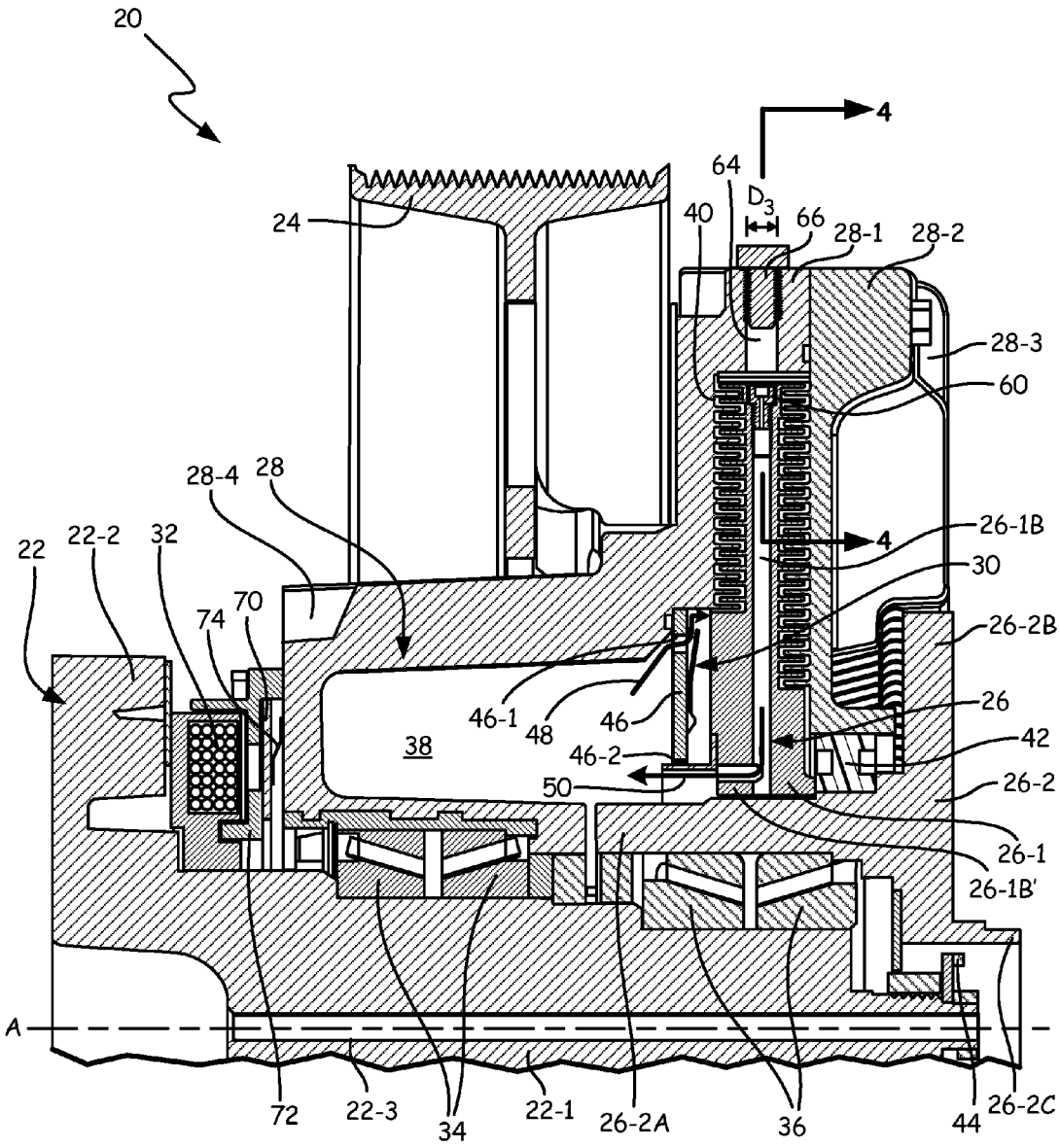
FIG. 1 is a cross-sectional view of a portion of an embodiment of a clutch according to the present invention.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present application claims priority to U.S. Provisional Patent Application Ser. No. 61/704,457, filed Sep. 22, 2012, which is hereby incorporated by reference in its entirety.

In general, the present invention relates to a viscous clutch capable of selectively transmitting a desired torque output from a provided torque input. The present clutch is "backwards" compared to most other viscous clutches in that an input member (e.g., pulley or sheave) attaches to a housing assembly of the device rather than to a rotor. In this way, the rotor can be attached to an output member, such as a fan, and thereby provide an output of the clutch. Further, the housing assembly connected to the input member can together provide a rotational input to the clutch. Advantages of this approach include allowing finned parts (e.g., the housing assembly or other input member(s)) to spin at a relatively high input speed whenever a rotational input is provided, not just when the output is selectively driven. In that way, cooling fins of the clutch can more effectively dissipate heat due to the greater interaction with ambient air that is possible at higher rotational speeds. Also, a reservoir of the clutch can be located in the housing assembly, which allows for greater cooling of the operating or shear fluid (e.g., silicone oil), due to proximity to an exterior of the clutch and to the cooling fins. Additionally, attaching the input member (e.g., pulley or sheave) to the housing can allow elimination of at least a portion of a center section of the input member, saving a great deal of weight (mass). Despite a reduced weight (mass), the input member—when configured as a pulley or sheave—can still provide a relatively large outer diameter, if desired for particular applications.

In addition or in the alternative, a clutch of the present invention can include a detachable/interchangeable wiper, which allows a size of the wiper to be easily changed, to help adjust a pumping rate of the clutch. Further, a pump bore insert can be used that is interchangeable to provide different bore passage sizes, which can also help adjust the pumping rate of the clutch. The adjustable and interchangeable wiper and pump bore insert features can help tune the clutch to operate with a variety of output members (e.g., fans) without requiring complete redesign of the entire clutch. It also allows the clutch to be tuned more readily while in the field, rather than just in a factory or laboratory.

Additional features and benefits of the present invention will be recognized by those of skill in the art in view of the entirety of the present disclosure, including the accompanying figures.

Figure 2:
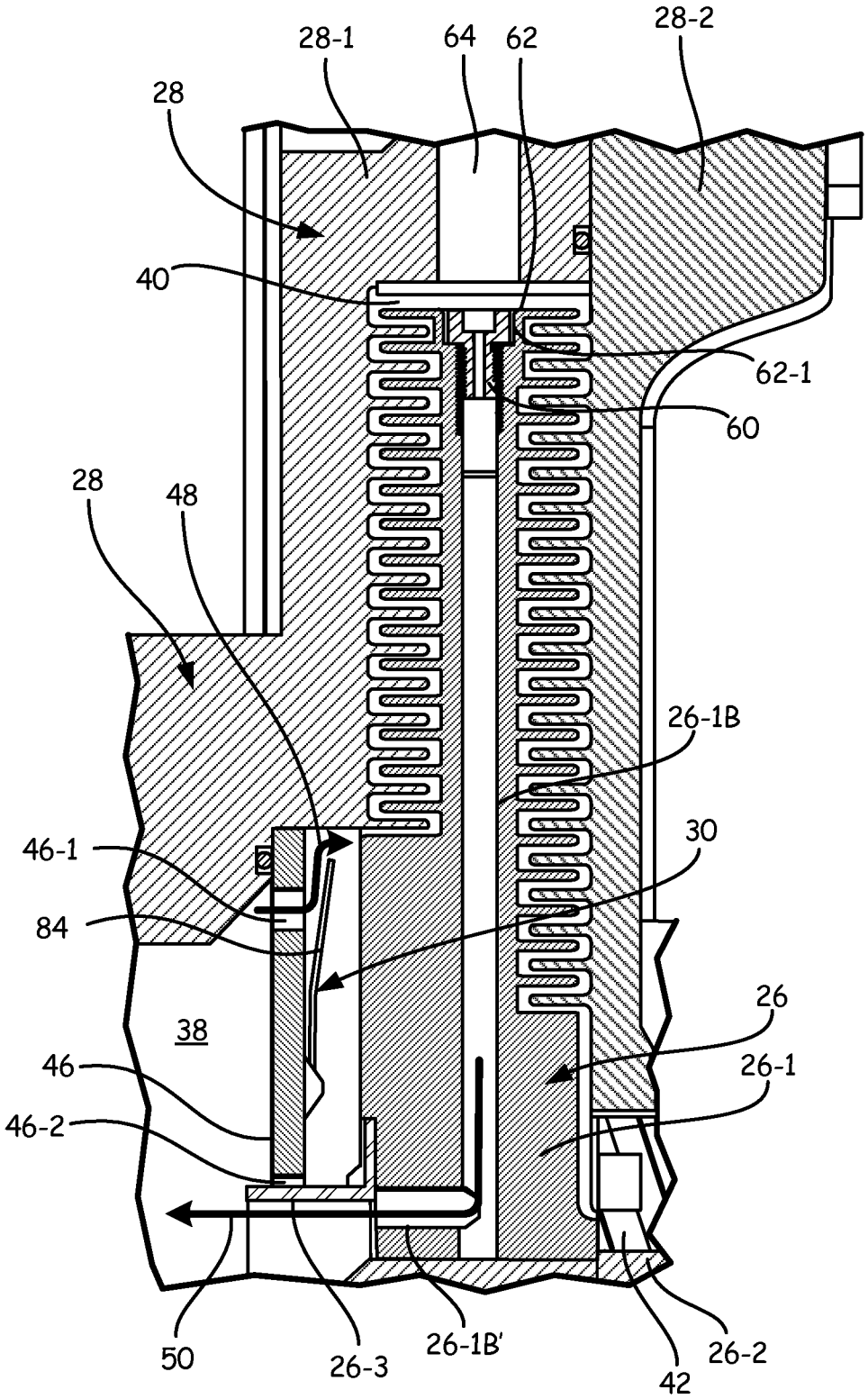
FIG. 2 is an enlarged cross-sectional view of a portion of the clutch of FIG. 1.

FIG. 1 is a cross-sectional view of a portion of an embodiment of a clutch 20, and FIG. 2 is an enlarged cross-sectional view of a portion of the clutch 20. Only a portion of the clutch 20 above the axis of rotation A is shown in FIG. 1, for simplicity. Persons of ordinary skill in the art will appreciate that portions of the clutch 20 omitted in FIG. 1 below the axis of rotation A can have a generally similar configuration to the portion depicted above the axis A, with the understanding that embodiments of clutches often have certain conventional features that are not completely symmetrical about the axis of rotation A. In the illustrated embodiment, the clutch 20 includes a journal bracket (or mounting shaft) 22, a pulley (or sheave) 24, a rotor assembly 26, a housing assembly 28, a valve assembly 30, an electromagnetic coil assembly 32, first bearing sets 34, second bearing sets 36, a reservoir 38, a working chamber 40, a seal bearing 42, and a sensor assembly 44. The clutch 20 defines an axis of rotation A.

The journal bracket (or mounting shaft) 22 can be a stationary (i.e., non-rotating) component that is secured to a desired mounting location, such as an engine block in a vehicle's engine compartment. It should be understood that while described as being "stationary" the journal bracket 22 can be installed within a moving vehicle, and the term "stationary" is used herein in relation to the mounting location. In the illustrated embodiment, the journal bracket 22 includes an axially extending shaft portion 22-1 and a generally radially extending flange portion 22-2. A conduit 22-3 can optionally be defined through the journal bracket 22, and can extend along substantially an entire axial length of the shaft portion 22-1. As illustrated, the conduit 22-3 is coaxially aligned with the axis A. Electrical wires or other items can pass through the conduit 22-3, as desired for particular applications. Suitable methods of manufacturing the journal bracket 22 include casting it from metallic material such as iron or steel. In a preferred embodiment, the journal bracket 22 is cast from ductile iron and then machined.

The housing assembly 28 of the illustrated embodiment includes a base 28-1 and a cover 28-2. The base 28-1 and the cover 28-2 can be secured together with any suitable means, such as using fasteners, welding, or the like. Cooling fins 28-3 can be provided on an exterior of the housing assembly 28 to help dissipate heat generated by the clutch 20 to ambient air. As shown in the embodiment of FIG. 1, a plurality of generally radially-extending, angularly-spaced cooling fins 28-3 are positioned on a front face of the cover 28-2. Additional generally radially-extending, circumferentially-spaced cooling fins 28-4 are located on an outer face of the base 28-1 of the housing assembly 28. It should be appreciated that the particular number, arrangement and configuration of the cooling fins 28-3 and/or 28-4 can vary as desired for particular applications. For instance, additional cooling fins can be placed on the base 28-1, the cover 28-2 and/or other components of the clutch 20 in further embodiments. Providing the cooling fins 28-3 and/or 28-4 on the housing assembly 28, when configured as a rotational input for the clutch 20, allows the cooling fins 28-3 and/or 28-4 to rotate whenever there is a rotational input to the clutch 20, thereby facilitating heat dissipation. In the illustrated embodiment, the housing assembly 28 is rotatably supported on the shaft portion 22-1 of the journal bracket 22 by the first bearing sets 34, and the housing assembly 28 generally encircles the shaft portion 22-1. In particular, the first bearing sets 34 can support the base 28-1, at a location generally axially aligned with the pulley 24 and radially inward from the reservoir 38, though other configurations are possible in further embodiments. The first bearing sets 34 can include tapered roller bearings, which can provide relatively high load capacity, or other types of bearings as desired. The cover 28-2 of the housing assembly 28 can further be rotationally supported on the rotor assembly 26 by the bearing seal 42. The bearing seal 42 can provide both a fluidic sealing function and a structural rotational support function, such as in the form of a journal bearing. As shown in FIG. 1, the first set of bearings 34 and the bearing seal 42 are located on opposite sides of the working chamber 40, measured in the axial direction. The base 28-1 and the cover 28-2 of the housing assembly 28 can each be cast from metallic material, such as die cast aluminum, and then machined. Significantly, the housing assembly 28 can form part of an input or torque-accepting portion of the clutch 20, as explained further below.

In the illustrated embodiment, the housing assembly 28 carries the reservoir 38, which rotates with the housing assembly 28. The reservoir 38 can hold a supply of a shear fluid (e.g., silicone oil) for use by the clutch 20, with a majority of the shear fluid held in the reservoir 38 when the clutch 20 is disengaged. Because the housing assembly 28 is part of an input subassembly, the housing assembly 28 always rotates whenever there is a rotational input to the housing assembly 28. Rotation of the housing assembly 28 in turn keeps the shear fluid under pressure while in the reservoir 38, allowing the shear fluid to be maintained at a relatively high level of kinetic energy to help facilitate quick engagement of the clutch 20. In one embodiment, the reservoir 38 can be provided as a generally annular cavity in the base 28-1 of the housing assembly 28. A reservoir cover 46 can be provided to define part of a boundary of the reservoir 38. In the illustrated embodiment, the reservoir cover 46 is configured as a generally annular plate attached to the base 28-1, such as by a press fit, swaging, the use of fasteners, or the like. One or more outlet bores (also called reservoir bores) 46-1 can be provided in the reservoir cover 46 (or alternatively, on another boundary portion of the reservoir 38) to allow shear fluid out of the reservoir 38, and can be controlled by the valve assembly 30. The location of the reservoir 38 in the housing assembly 28 allows the shear fluid to remain relatively close to the cooling fins 28-3 and/or 28-4 and ambient air, to facilitate heat dissipation.

The pulley (or sheave) 24 can be fixedly secured directly or indirectly to the housing assembly 28, such as to the base 28-1, and is configured to accept rotational input from a belt (not shown). The housing assembly 28 can co-rotate with the pulley 24. In the illustrated embodiment, the pulley 24 is axially positioned forward of the flange portion 22-2 of the journal bracket 22. Moreover, in the illustrated embodiment, the pulley 24 is configured as a separate element that is attached, using suitable fasteners, to the housing assembly 28. However, in further embodiments the pulley 24 could be integrally and monolithically incorporated into a portion of the housing assembly 28. A size (i.e., diameter) of a belt engagement portion of the pulley 24 can be selected to help provide a desired rotational input speed to the clutch 20, as will be understood by persons of ordinary skill in the art. In the illustrated embodiment, the pulley 24 provides a relatively large belt engagement diameter, thereby allowing relatively high input speeds, which in turn facilitates relatively high output speeds when the clutch 20 is engaged. Attaching the pulley 24 to the housing assembly 28 can allow a "hollow" center section of the pulley 24, because the pulley 24 need not extend inward beyond a generally radially outward portion of the housing assembly 28, thereby helping to reduce overall mass of the clutch 20. In one embodiment, the pulley 24 can be cast from a metallic material such as iron or steel, and then machined. In an alternative embodiment, the pulley 24 can be spun formed and attached to a separate hub section (not shown) made from a casting. In yet another alternative embodiment, a roll forming or circular forming process in combination with welding or brazing as described in U.S. Pat. No. 4,080,704 can be used. Any suitable further manufacturing process or processes can be used to make the pulley 24.

The rotor assembly 26 of the illustrated embodiment includes a disk 26-1, a bearing hub 26-2, and a flow guide 26-3. The disk 26-1 and the bearing hub 26-2 of the rotor assembly 26 can be configured as separate components fixedly secured together with a suitable connection, such as a press-fit, knurled, threaded, splined, or other connection, such that those components rotate together (i.e., co-rotate). In alternative embodiments, the disk 26-1 and the bearing hub 26-2 can be integrally and monolithically formed together. The rotor assembly 26 can be rotatably supported on the shaft portion 22-1 of the journal bracket 22 by the second bearing sets 36. The second bearing sets 36 can include tapered roller bearings, which can provide relatively high load capacity, or other types of bearings as desired. As shown in FIG. 1, the rotor assembly 26 is positioned to generally encircle the shaft portion 22-1 of the journal bracket 22. Components of the rotor assembly 26 can each be formed by casting, and the ribs, openings, etc. can be formed by machining.

The disk 26-1 of the rotor assembly 26 can include a number of concentric annular ribs on both front and rear sides near an outer diameter portion in a conventional arrangement. Those annular ribs can complement similar ribs on the cover assembly 28 along the working chamber 40. In the illustrated embodiment, the disk 26-1 is enclosed by the housing assembly 28. One or more fluid openings (not shown) can be formed generally axially through the disk 26-1, such as near an outer diameter portion, in a conventional manner in order to permit shear fluid in the working chamber 40 to pass between front and rear sides of the disk 26-1. A return bore including a first return bore portion 26-1B and a second return bore portion 26-1B' can be provided through the disk 26-1. In the embodiment shown in FIGS. 1 and 2, the first return bore portion 26-1B extends generally radially through the entire disk 26-1 (including through an outer diameter portion of the disk 26-1), and the second return bore portion 26-1B' extends generally axially from a rear face of the disk 26-1 to the first return bore portion 26-1B. The flow guide 26-3 can be a sleeve-like member attached to the disk 26-1, or other suitable mounting location. In the illustrated embodiment, the flow guide 26-3 is attached to the disk 26-1 and provides an interior passageway that connects in fluid communication with the second return bore portion 26-1B' as well as with the reservoir 38. The flow guide 26-3 can traverse the reservoir cover 46, such as by passing through a central opening 46-2 in the reservoir cover 46.

In the illustrated embodiment of the rotor assembly 26, the bearing hub (also called a fan hub) 26-2 includes a generally axially-extending sleeve portion 26-2A, a generally radially-extending flange portion 26-2B, and a pilot portion 26-2C. The sleeve portion 26-2A can have a generally cylindrical shape, and can be generally axially aligned with both the disk 26-1 and the second bearing sets 36. The seal bearing 42 can be engaged between the bearing hub 26-2 (and specifically the sleeve portion 26-2A) and the cover 28-2 of the housing assembly 28. The seal bearing 42 can also adjoin the disk 26-1, and can be aligned or closely positioned in the axial direction relative to the second bearing sets 36. The flange portion 26-2B can be positioned at or near a forward end of the sleeve portion 26-2A, and the pilot portion 26-2C can be positioned at a central, forward-facing portion of the flange portion 26-2B. The flange portion 26-2B and the pilot portion 26-2C can each at least partially extend beyond (or outside of) the housing assembly 28, such that the flange portion 26-2B, the pilot portion 26-2C and/or other portions of the bearing hub 26-2 of the rotor assembly 26 can provide a mounting surface for an output structure (e.g., fan, pump, shaft, etc.) at or near a front of the clutch 20. It should be noted, however, that in alternative embodiments the output structure could be mounted elsewhere. In this way, the rotor assembly 26 can form part of a selectively controllable output or torque-delivering portion of the clutch 20, as explained further below. Use of the bearing hub 26-2 allows attachment geometry for an output member (e.g., fan, etc.) to be relatively easily adjusted without a need to re-design other components of the clutch 20. For instance, the same basic overall clutch design could be provided with a variety of different bearing hub 26-2 configurations to suit different applications.

The working chamber 40 (synonymously called a working area) is defined between the rotor assembly 26 and the housing assembly 28. In the illustrated embodiment the working chamber 40 extends along opposite front and rear sides of the disk 26-1, though in further embodiments the working chamber 40 could be limited to primarily one side of the disk 26-1. The presence of the shear fluid in the working chamber 40 creates a fluid friction coupling between the rotor assembly 26 and the housing assembly 28 to engage the clutch 20 and transmit torque between input and output components. An instantaneous percentage of torque transmission can vary as a function of the amount of shear fluid in the working chamber 40. Generally, the shear fluid is delivered to the working chamber 40 from the reservoir 38 along a fluid delivery path 48, and is returned to the reservoir 38 from the working chamber 40 through the return path 50. The fluid delivery and return paths 48 and 50 are each represented schematically by arrows in FIGS. 1 and 2. As shown in FIGS. 1 and 2, the fluid delivery path 48 extends from the reservoir 38 through the outlet bore 46-1 in the reservoir cover 46 to the working chamber 40. In the illustrated embodiment, the return path 50 extends substantially radially from a portion of the working chamber 40 directly radially outward from the disk 26-1 of the rotor assembly 26 through the first return bore portion 26-1B in the disk 26-1, then turns and passes through the second return bore portion 26-1B' and the flow guide 26-3 before being returned to the reservoir 38. In that way, the shear fluid can pass (or be pumped) directly radially inward from the working chamber 40 along the fluid return path 50 through the first return bore portion 26-1B. Persons of ordinary skill in the art will appreciate that the precise location and shape of the fluid [deliver] *delivery* and return paths 48 and 50 can each vary as desired for particular applications. One or more suitable pumping structures can be included at or along the working chamber 40 to dynamically pump the shear fluid out of the working chamber 40 through the return path 50. Further discussion of one embodiment of a pumping structure is provided below with respect to the discussion of FIG. 3.

The valve assembly 30 can be attached to and carried by the housing assembly 28. In general, the valve assembly 30 is used to selectively cover and uncover the opening outlet bore 46-1 from the reservoir 38. When the outlet bore 46-1 is uncovered (i.e., opened), the shear fluid is allowed to flow from the reservoir 38 to the working chamber 40 along the fluid delivery path 48. The valve assembly 30 can be biased to an open position by default, for instance using a spring bias force. As explained further below, energizing the electromagnetic coil assembly 32 can actuate the valve assembly 30 to at least partially cover the outlet bore 46-1. Further discussion of suitable configurations of the valve assembly 30 is provided below with respect to the discussion of FIG. [4] *6*.

The electromagnetic coil assembly 32 as shown in FIG. 1 can include one or more wound coils of high temperature insulated copper wire placed in a cup (e.g., a steel cup) used to direct the flux for actuation of the valve assembly 30. In one embodiment, as discussed further below with respect to FIG. 6, the electromagnetic coil assembly 32 can have multiple windings. The coil [42] *of the coil assembly 32* can be rotationally fixed relative to the journal bracket 22, and can be positioned adjacent to the housing assembly 28 and the valve assembly 30. In the illustrated embodiment, the coil [22] *of the coil assembly 32* encircles and is supported by the shaft portion 22-1 of the journal bracket 22. In the illustrated embodiment, the coil assembly 32 is positioned generally rearward of the housing assembly 28 and the pulley 24, though the electromagnetic coil assembly 32 can be placed in other locations in alternative embodiments.

A variety of alternative control schemes are possible for operating the clutch 20. In one embodiment, the electromagnetic coil assembly 32 can be energized in a coarse on/off manner such that the valve assembly 30 tends to remain in either a fully open position (the default position) or a fully closed position when the coil assembly 32 is selectively energized. In another embodiment, the coil assembly 32 can be energized using pulse width modulated (PWM) signals from an electronic engine controller (not shown). PWM signals allow a dynamically variable average volume of shear fluid to flow out of the reservoir 38. Depending on the pulse width (i.e., duration) and frequency of PWM signals, the valve assembly 30 can variably adjust the amount of shear fluid allowed to pass out of the reservoir 38 through the outlet bore 46-1 to the working chamber 40 over time. That is, the PWM signals cause the coil assembly 32 to open and close the valve assembly 30, and an average amount of time that the valve assembly 30 is open (i.e., uncovering the outlet bore 46-1) dictates the average amount of shear fluid that flows out of the reservoir 38. Greater pulse widths and/or greater frequencies of PWM signals will tend to close the valve assembly 30 more, on average, allowing lower average volumes of shear fluid to pass to the working chamber 40. This PWM control scheme permits the clutch 20 to be operated at selectively variable speeds, such that the rotor assembly 26 can rotate at anywhere from 0% to approximately 100% of the rotational speed of the housing assembly 28 and the pulley 24, rather than merely in a coarse and binary on/off fashion.

The speed sensor assembly 44 can include a target wheel carried by and rotating with the bearing hub 26-2 of the rotor assembly 26 that is located in close proximity to a Hall Effect sensor carried by the journal bracket 22. The Hall Effect sensor can detect each revolution of the target wheel in order to determine an output speed of the clutch 20, which can be used to adjust control of the valve assembly 30 and/or for other purposes. In the illustrated embodiment, the sensor assembly 44 can be located, in the axial direction, within the pilot portion 26-2C of the bearing hub 26-2 of the rotor assembly 26. It should be noted that in further embodiments, other types of sensors can be used, or the sensor assembly can be omitted entirely.

Figure 3:
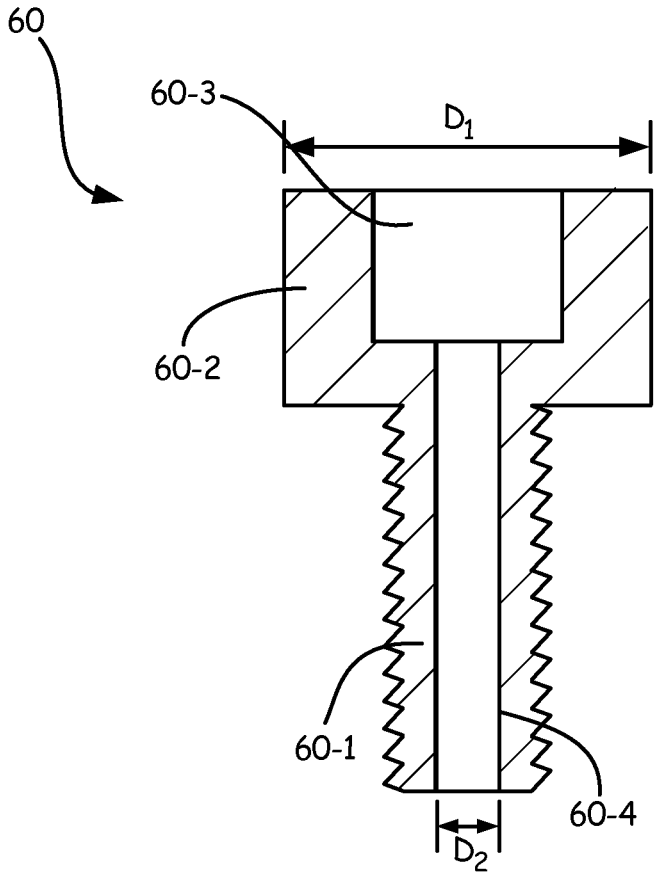
FIG. 3 is a cross-sectional view of a pump bore insert suitable for use with the clutch of FIG. 1.

FIG. 3 is a cross-sectional view of an interchangeable pump bore insert 60 suitable for use with the clutch 20. The pump bore insert 60 can function as part of a pump assembly, to facilitate pumping the shear fluid from the working chamber 40 to the reservoir 38 along the fluid return path 50. In the illustrated embodiment, the pump bore insert 60 includes a shank 60-1, a head 60-2, an engagement structure 60-3, and a bore 60-4. The shank 60-1 can be threaded, and can be engaged with a cooperating threaded region of a radially outer end of the first return bore portion 26-1B, such that the shank 60-1 can extend at least partially into the first return bore portion 26-1B. The head 60-2 can adjoin the shank 60-1, and the engagement structure 60-3 is supported by the head 60-2 and in various embodiments can be located on, in or along the head 60-2. The engagement structure 60-3 can be, for example, an engagement for a flat or Phillips-head screwdriver or an engagement for an Allen, Reynolds, Torx® or other tool bit, generally located in a central, outwardly-facing portion of the head 60-2. In alternative embodiments, the engagement structure 60-3 can comprise flats on outer surfaces of the head 60-2. In still further embodiments, the engagement structure 60-3 can be located in, on or along the shank 60-1. The bore 60-4 can extend between opposite ends of the pump bore insert 60, such as through both the shank 60-1 and the head 60-2. The bore 60-4 can be configured as a generally cylindrical passageway, or can have another suitable configuration that allows for fluid flow therethrough. The bore 60-4 can be in fluid communication with the first portion of the first return bore portion 26-1B and the fluid return path 50. In that way, the shear fluid can pass (or be pumped) directly radially inward from the working chamber 40 through the bore 60-4 and through the first return bore portion 26-1B along the fluid return path 50.

The pump bore insert 60 can be configured to resemble a bolt modified to include the bore 60-4. Indeed, it is possible to make the pump bore insert 60 by machining (e.g., drilling) the bore 60-4 through a conventional bolt of a suitable configuration. In alternative embodiments, the pump bore insert 60 can have a different configuration. For instance, the head 60-2 can be a separate element, such as a conformable seal strip, block, etc., that is attached to the shank 60-1. As shown in FIG. 3, the pump bore insert 60 has a dimension (e.g., diameter) $D_1$, and the bore 60-4 has a dimension (e.g., diameter) $D_2$.

The pump bore insert 60 can be arranged relative to an immediately surrounding structure 62. In one embodiment, the pump bore insert 60 is engaged at an outer diameter portion of the disk 26-1, such that the immediately surrounding structure 62 can be an outer diameter surface of the disk 26-1 (see FIG. 2). A countersunk portion 62-1 can be provided in or along the surrounding structure 62 to countersink the pump bore insert 60 relative to the working chamber 40, which can help prevent the pump bore insert 60 from protruding into the working chamber 40 if desired.

As best shown in FIGS. 1 and 2, an access opening 64 can be provided in the housing assembly 28, such as in the base 28-1, which permits access to the interchangeable pump bore *insert* 60 while the cover 28-2 is installed. The access opening 64 can have a dimension $D_3$ that is larger than the dimension $D_1$ of the interchangeable pump bore insert [60-2] *60*, to help ensure sufficient room for a suitable tool to pass through the housing assembly 28 to engage, remove and replace the interchangeable pump bore insert 60, as desired. A plug 66, such as a threaded bolt or other suitable element, can be removably engaged with the access opening 64 to close and seal the housing assembly 28 and help prevent leakage of the shear fluid.

The dimension $D_2$ of the bore 60-4 can be selected as desired for particular applications. Larger dimensions for $D_2$ generally allow for greater pumping rates, while smaller dimensions for $D_2$ can generally allow lower pumping rates. In this way the bore 60-4 provides a pump metering function. The dimension $D_2$ of the bore 60-4 can be varied in size by replacing the interchangeable pump bore insert 60 with a different insert 60 having a different configuration.

Persons of ordinary skill in the art will recognize that the interchangeable pump bore insert 60 allows a dimension $D_2$ of the pump bore 60-4 to be easily changed. By adjusting a parameter such as the dimension $D_2$, changes to operational characteristics of the clutch 20 (e.g., shear fluid pressurization for pumping along the fluid return path 50) can be tuned to operate with a variety of output devices (e.g., fans) without requiring complete redesign or disassembly of the entire clutch 20. Further explanation of the method of adjusting the clutch 20 is provided below. It should also be understood that the interchangeable pump bore insert 60 can be utilized with nearly any type of viscous clutch, including those configured differently than the clutch 20. For instance, the interchangeable pump bore *insert* 60 can be utilized in a clutch that provides a fluid return path through a housing assembly rather than through a rotor assembly as with the clutch 20. The configuration shown in FIGS. 1-3 is provided merely by way of example and not limitation.

Figure 4:
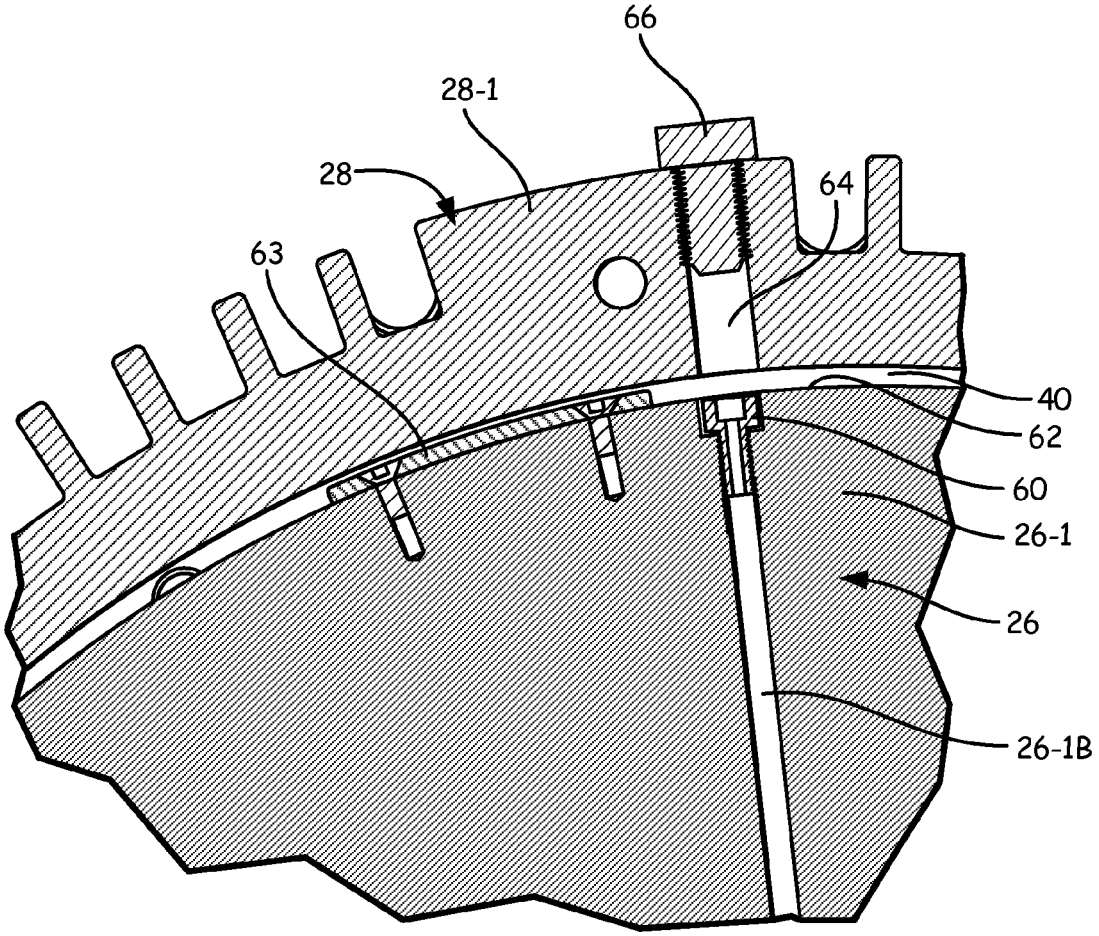
FIG. 4 is a cross-sectional view of another portion of the clutch, taken along line 4-4 of FIG. 1.
Figure 5:
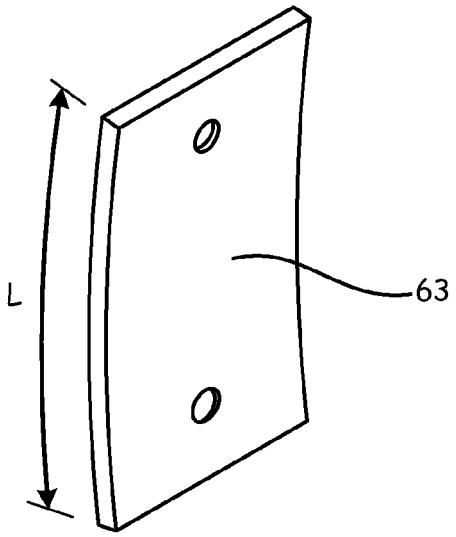
FIG. 5 is a perspective view of an embodiment of a wiper suitable for use with the clutch of FIG. 1.

FIG. 4 is a cross-sectional view of another portion of the clutch 20, taken along line 4-4 of FIG. 1, and FIG. 5 is a perspective view of an embodiment of a wiper 63 for the clutch 20. The wiper 63 can be positioned in, at or along the working chamber 40 of the clutch 20, and can act as a dam to help pump the working fluid out of the working chamber 40 and through the fluid return path 50. The wiper 63 can be used in conjunction with other pumping structures (not shown), such as one or more additional pump, dam or baffle elements positioned radially or axially opposite the wiper 63 along the working chamber 40. In the illustrated embodiment, the wiper 63 is attached to the disk 26-1 of the rotor assembly 26, such as using suitable fasteners. Moreover, as shown in FIG. 4, the wiper 63 is attached to the surrounding structure 62 at the outer diameter of the disk 26-1 of the rotor assembly 26, and adjacent to the pump bore insert 60 and the first return bore portion 26-1B. In an [alternatively] *alternative* embodiment, the wiper 63 could be attached to an inner diameter portion of the housing assembly 28. The wiper 63 can protrude into the working chamber 40 relative to immediately surrounding structure 62, which facilitates pressurization of the working fluid to pump the shear fluid along the fluid return path 50. An amount of protrusion of the wiper [60] *63* into the working chamber 40 can influence a degree of pumping of the shear fluid through the fluid return path 50, with greater dimensions for the length L generally providing increased pumping pressures for increased pumping rates, as well as influencing an off speed of the clutch 20.

As shown most clearly in FIG. 5, the wiper 63 can have a generally rectangular perimeter and be curved to [corresponding] *correspond* to a mounting location (e.g., the surrounding structure 62 on the disk 26-1). The wiper 63 can define an arc length L, which can be established in relation to a central angle (measured from the axis A). In one embodiment, the arc length L can be defined by a central angle of approximately 15°. A thickness of the wiper can be selected to provide a desired amount of protrusion into the working chamber 40. The arc length L and/or the thickness of the wiper 63 can be increased or decreased by selecting an appropriate configuration of the wiper 63. Because the wiper 63 can be a separate element, it can easily be modified without requiring a major re-design of the clutch 20, such as a new casting for the disk 26-1. It should also be understood that the wiper 63 can be utilized with nearly any type of viscous clutch, including those configured differently than the clutch 20. For instance, the wiper 63 can be utilized in a clutch that provides a fluid return path through a housing assembly rather than through a rotor assembly as with the clutch 20. The configuration shown in FIGS. 4 and 5 is provided merely by way of example and not limitation.

Figure 6:
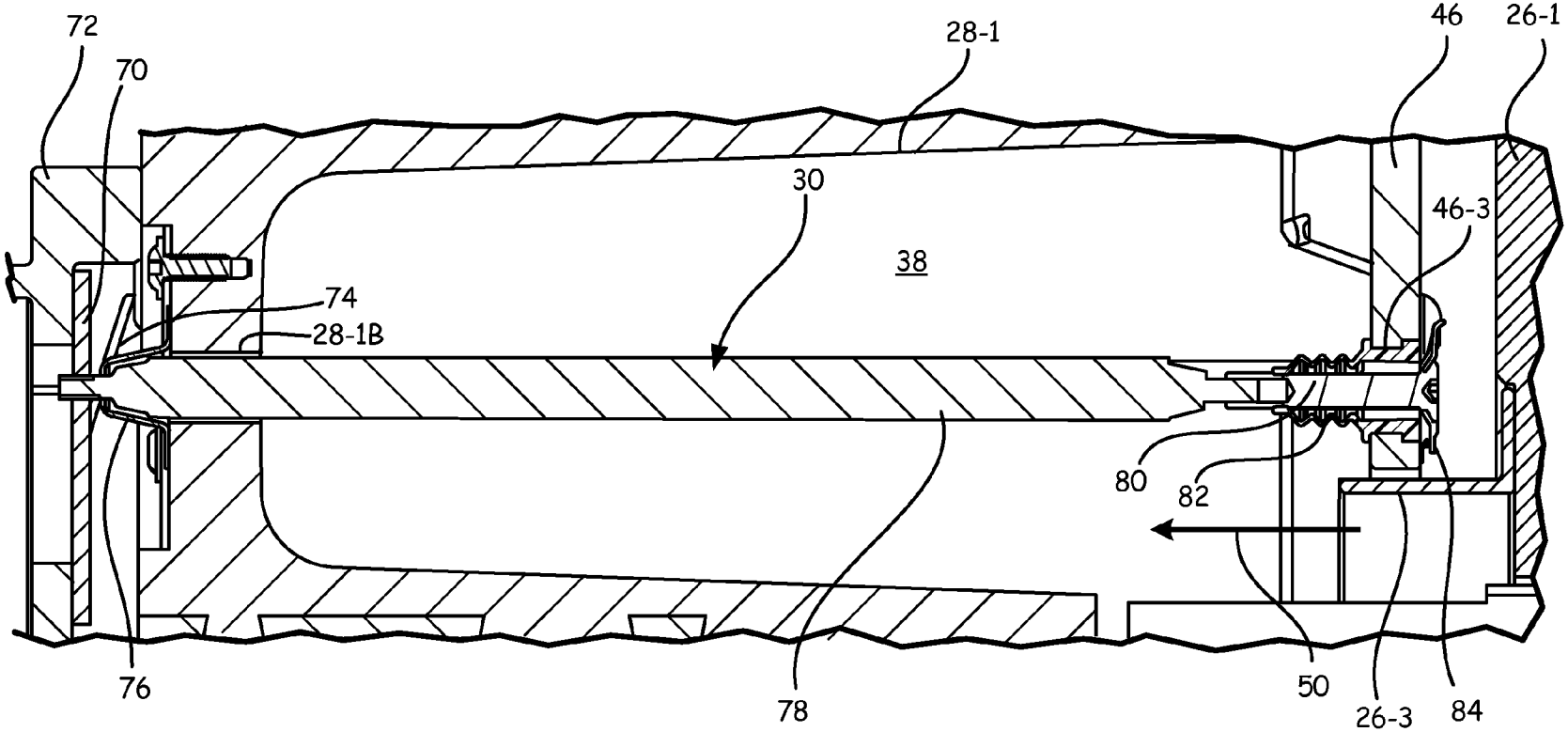
FIG. 6 is a cross-sectional view of an embodiment of a valve assembly suitable for use with the clutch of FIG. 1.

FIG. 6 is a cross-sectional view of an embodiment of a valve assembly suitable for use with the clutch 20. The valve assembly 30 of the illustrated embodiment includes a translating armature 70, a field armature (also called a field rotor) 72, a bias spring 74, a diaphragm 76, a rod 78, a control member 80, a bellows 82, and a valve element 84. It should be noted that the cross-sectional view of the valve assembly 30 [it] *is* taken at a sectional plane with a different angular orientation than the sectional plane of FIGS. 1 and 2, which means that not all structures or portions of structures are visible in each view.

In one embodiment, the field armature 72 can be fixed (i.e., non-translating) at a location proximate the electromagnetic coil assembly 32 and the translating armature 70 can be positioned at least partially inside the field armature 72. The bias spring 74 can bias the translating armature 70 relative to the field armature 72 to a default position, such as rearward against the field armature 72. The rod 78 can be engaged with or secured to the translating armature 70 and can pass through an opening 28-1B in the base 28-1 of the housing assembly 28, with the diaphragm 76 providing fluidic sealing at the opening 28-1B. The control member 80 can be configured as a bolt and can be engaged to the rod 78 generally opposite the translating armature 70. The control member 80 can pass through an opening 46-3 in the reservoir cover 46, and the bellows 82 can provide fluidic sealing at the opening 46-3. The valve element 84 can be attached to the control member 80 generally opposite the rod 78, and can provide a seating surface (not visible in FIG. [4] *6*) for selectively covering the outlet bore 46-1 (see FIGS. 1 and 2).

Energizing the coil assembly 32 generates magnetic flux that can pass through the field armature 72 and can cause the translating armature 70 to translate, which in turn translates the rod 78, the control member 80 and the valve element 84. Energizing the coil *assembly* 32 creates a magnetic force that generally works against a spring force of the bias spring 74. The selective energization of the coil assembly 32 thus allows the translating armature 70, as well as connected structures such as the valve element 84, to move back and forth axially in a linear fashion rather than teetering/pivoting at an angle like most viscous clutch valves. The linear translation action allows the clutch 20 to open and close two or more valve assemblies (only one is visible in FIG. [4] *6*) concurrently.

In an alternative embodiment, the valve assembly 30 can be configured similarly to that described in U.S. Pat. No. 6,419,064, entitled "Fluid Friction Coupling." It should be understood that nearly any known type of electromagnetically actuated valve assembly can be utilized in alternative embodiments.

Figure 7:
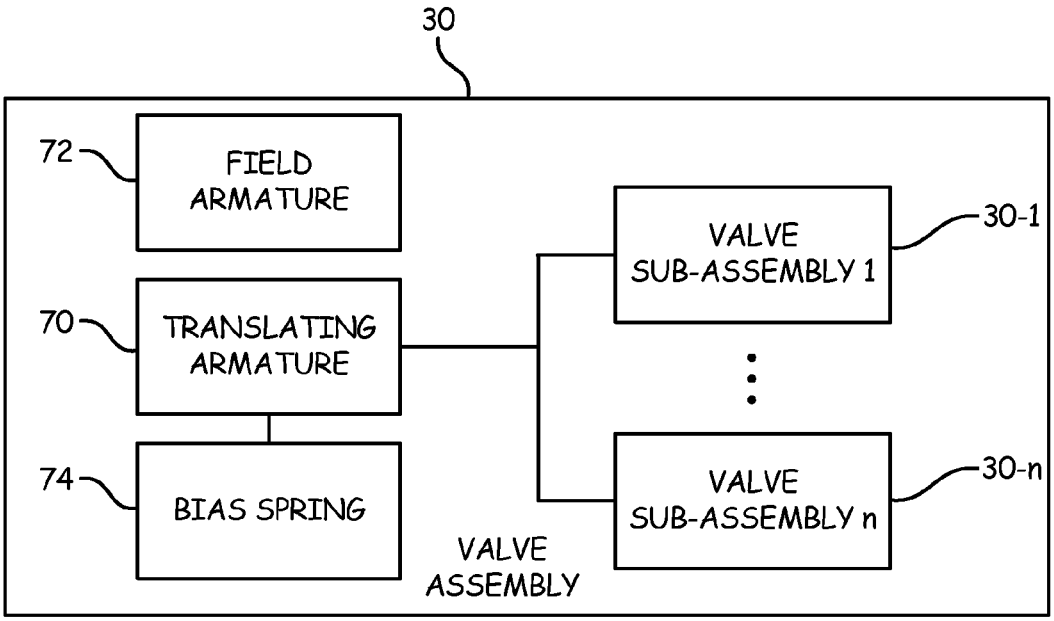
FIG. 7 is a schematic block diagram of another embodiment of the valve assembly suitable for use with the clutch of FIG. 1.

FIG. 7 is a schematic block diagram of an embodiment of the valve assembly 30 that includes a translating armature 70, a field armature 72, a bias spring 74, and a plurality of valve subassemblies 30-1 to 30-n. The translating armature 70, the field armature 72, and the bias spring 74 can be configured in any desired manner, such as in the manner described above with respect to FIG. 6. In one embodiment, each of the valve subassemblies 30-1 to 30-n can include a rod 78, control bolt 80 and valve element 84 (e.g., as described above with respect to FIG. [4] *6*), and each of the valve subassemblies 30-1 to 30-n can be engaged with or attached to the translating armature 70 (e.g., at different angular positions about the axis of rotation A) for common (e.g., concurrent) actuation. For a relatively large clutch (e.g., providing approximately 2000 Nm or more of torque), extra oil flow is needed beyond that provided with a typical single valve and the present inventors have discovered that the use of two or more of the valve subassemblies 30-1 to 30-n will solve that oil flow problem. Each valve member 84 moved by the translating armature 70 can cover and uncover a different outlet bore 46-1.

Figure 8:
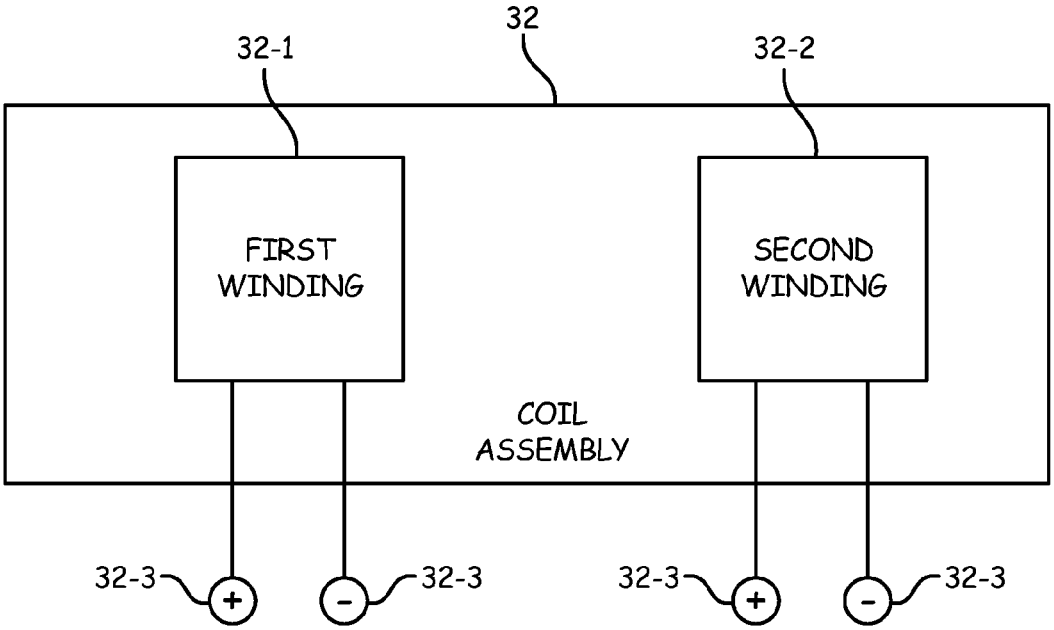
FIG. 8 is a schematic block diagram of an embodiment of an electromagnetic coil assembly suitable for use with the clutch of FIG. 1.

FIG. 8 is a schematic block diagram of an embodiment of the electromagnetic coil assembly 32 suitable for use with the clutch 20 and the valve assembly 30. In the illustrated embodiment, the electromagnetic coil assembly 32 includes two windings 32-1 and 32-2, each having terminals 32-3. The multiple windings 32-1 and 32-2 allow the clutch 20 to be used at different voltage levels (e.g., 12V or 24V) depending on how the windings 32-1 or 32-2 are connected to an operational power source (not shown) through the associated terminals 32-3. For example, the windings 32-1 or 32-2 can be wired in series for use in a 24 volt or parallel for use in a 12 volt application. Persons of ordinary skill in the art will recognize that any desired number of windings can be provided in further embodiments, and only a single winding or more than two windings can be provided in such further embodiments.

Figure 9:
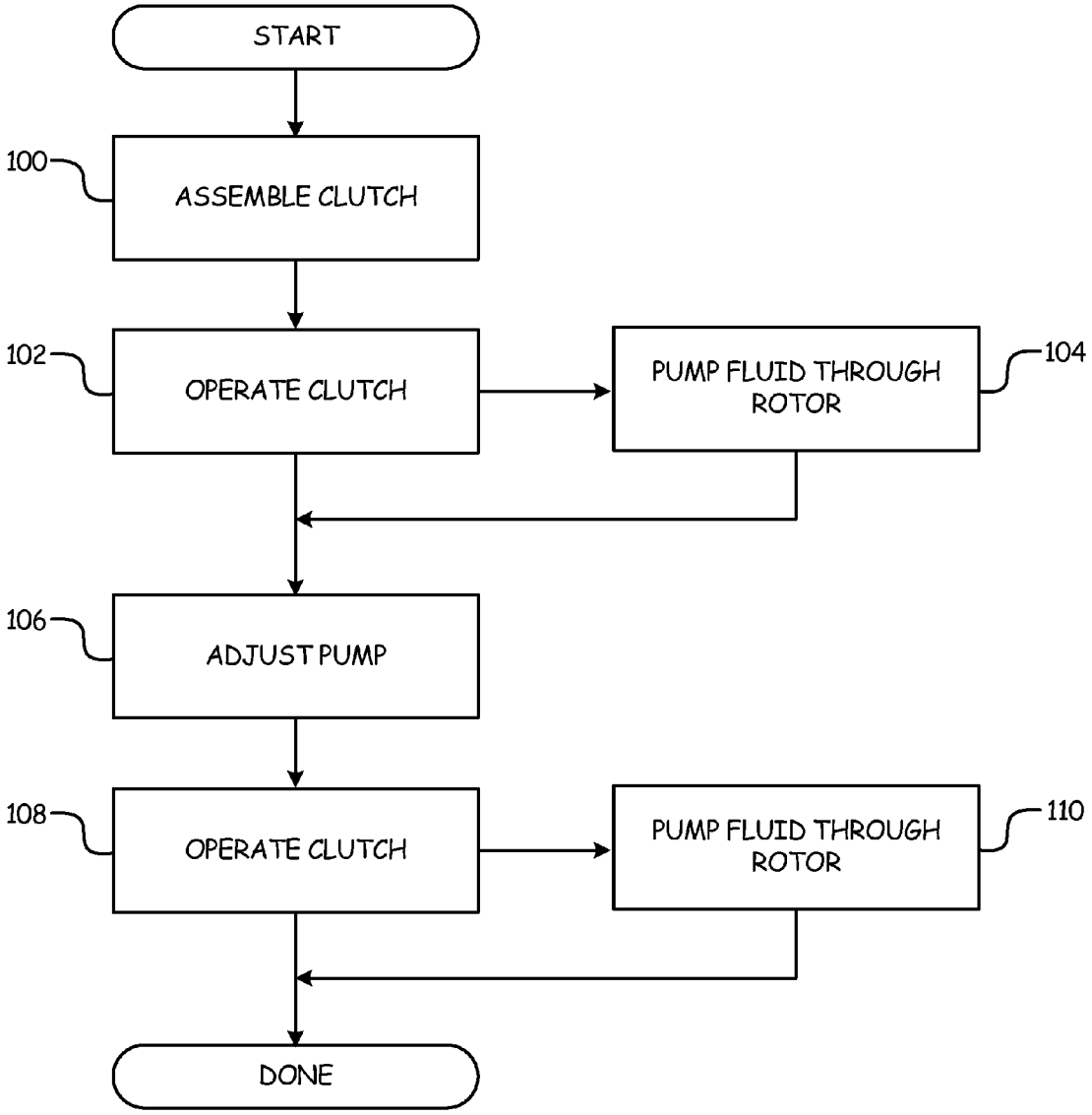
FIG. 9 is a flow chart of an embodiment of a method of assembling and using a clutch according to the present invention.

FIG. 9 is a flow chart of an embodiment of a method of assembling and using a clutch 20. The method can begin by initially fabricating and assembling the clutch (step 100). Initial operation of the clutch 20 can include setting an initial configuration of an interchangeable pump bore insert 60 for a pump assembly. The initial configuration can include first settings for a dimension $D_2$ of a bore 60-4 and/or a length L of a wiper 63, and/or other configuration parameters. The fully assembled clutch 20 can then optionally be operated, that is to say the clutch 20 can be used to selectively transmit torque from an input to an output (step 102). In conjunction with operating the clutch at step 102, a shear fluid can be pumped along a fluid return path 50 that passes radially through a disk 26-1 of a rotor assembly 26 (step 104). The interchangeable pump bore insert 60 can be used to help pump the shear fluid from the working chamber 40 to the reservoir 38 along the fluid return path 50. The first settings can cause the shear fluid to be pumped from the working chamber 40 at a first rate at step 104. Next, the configuration of the clutch 20 can be adjusted (step 106). Adjustment can include replacement of the interchangeable pump bore insert 60, such as to provide second settings for a dimension $D_2$ of the bore 60-4 and/or a length L of the wiper 63, and/or other configuration parameters. In order to effectuate a desired adjustment or component interchange, a tool can be inserted through the access opening 64 in the housing assembly 28 to engage the engagement structure 60-3 of the interchangeable pump bore insert 60, for instance. Adjustment and/or interchange could be provided as part of regular maintenance, a remanufacturing operation, as part of reassignment for a different application (e.g., to use the clutch 20 with a different output fan, in a different vehicle, etc.), or for any other desired reason. The clutch 20 can then be operated, that is to say the clutch 20 can again be used to selectively transmit torque from an input to an output (step 108). In conjunction with operating the clutch at step 108, the shear fluid can again be pumped along the fluid return path 50 that passes radially through the disk 26-1 of the rotor assembly 26 (step 110). The second settings can cause the shear fluid to be pumped from the working chamber 40 at a second rate at step 110, and the second rate can be different from the first rate. This allows a diameter of the bore 60-4 to be changed, for instance, to provide different metering of shear fluid being pumped back to the reservoir 38.

Persons of ordinary skill in the art will recognize that various steps described with respect to FIG. 9 can be omitted in alternative embodiments, and various additional steps not specifically mentioned can be performed in conjunction with the enumerated steps. For instance, although the method illustrated in FIG. 9 indicates that a clutch is operated prior to adjustment, it is possible to adjust the clutch without undergoing actual use in the field, such as by making adjustments on a factory floor or in a test laboratory to provide enhanced quality control prior to completion of an initial fabrication process.

DISCUSSION OF POSSIBLE EMBODIMENTS

The following are non-exclusive descriptions of possible embodiments of the present invention.

A viscous clutch can include a housing assembly; a rotor assembly; a reservoir to hold a supply of a shear fluid; a working chamber operatively positioned between the housing assembly and the rotor assembly, wherein selective introduction of the shear fluid to the working chamber facilitates selective torque transmission between the housing assembly and the rotor assembly; and a fluid return bore that extends radially through at least an outer diameter portion of the rotor assembly to the working chamber, the fluid return bore forming at least a portion of a fluid return path from the working chamber to the reservoir.

The viscous clutch of the preceding paragraph can optionally include, additionally and/or alternatively, any one or more of the following features, configurations and/or additional components:

an electromagnetically actuated valve assembly configured to controllably translate a first valve element that controls flow of the shear fluid between the reservoir and the working chamber;

a second valve element configured to be actuated concurrently with the first valve element to further control flow of the shear fluid between the reservoir and the working chamber;

an electromagnetic coil assembly positioned adjacent to the housing assembly, wherein the electromagnetic coil assembly includes first and second windings each having terminals electrically connectable in series or parallel for operation at different voltages;

the rotor assembly can include a disk, wherein the fluid return bore extends radially through at least a portion of the disk; and a bearing hub connected to the disk for co-rotation therewith, wherein the bearing hub extends beyond the housing assembly to provide a mounting location for an output member;

a pulley connected to the housing assembly for co-rotation with the housing assembly;

a rotationally fixed journal bracket having a shaft portion; a first set of tapered roller bearings for rotationally supporting the housing assembly on the shaft portion of the journal bracket; and a second set of tapered roller bearings for rotationally supporting the rotor assembly on the shaft portion of the journal bracket;

the housing assembly can include a plurality of cooling fins, and the cooling fins can be configured to rotate whenever there is a rotational input to the viscous clutch;

an interchangeable pump bore insert positioned at least partially within the fluid return bore, wherein the interchangeable pump bore insert includes a bore in fluid communication with the fluid return bore;

an access opening in the housing assembly configured to allow access to the interchangeable pump bore insert; the interchangeable pump bore *insert* can be engaged at an outer diameter portion of the rotor assembly;

a wiper at an outer diameter portion of the rotor assembly and protruding, at least partially, into the working chamber;

the wiper can be removably attached to a disk of the rotor assembly; and/or a reservoir cover defining a portion of a boundary of the reservoir; and a flow guide that traverses the reservoir cover to deliver the shear fluid from fluid return bore of the rotor assembly to the reservoir along the fluid return path.

A method for selective torque transmission can include delivering a rotational input to a housing assembly; selectively delivering a shear fluid to a working chamber; transmitting torque to a rotor assembly as a function of volume of the shear fluid selectively delivered to the working chamber; and returning the shear fluid from the working chamber to a reservoir along a substantially radial bore through a disk of the rotor assembly.

The method of the preceding paragraph can optionally include, additionally and/or alternatively, any one or more of the following steps, features, and/or configurations:

providing a first interchangeable pump bore insert to provide pumping at a first rate when returning the shear fluid from the working chamber to the reservoir;

replacing the first interchangeable pump bore insert having a bore of a first size with a second interchangeable pump bore insert having a bore of a second size that is different from the first size; and/or securing a wiper to an outer diameter portion of the disk adjacent to the substantially radial bore such that the wiper protrudes into the working chamber.

A viscous clutch can include a housing assembly; a rotor assembly; a reservoir to hold a supply of a shear fluid; a working chamber operatively positioned between the housing assembly and the rotor assembly, wherein selective introduction of the shear fluid to the working chamber facilitates selective torque transmission between the housing assembly and the rotor assembly; and a pump bore insert having a bore in fluid communication with a fluid return path extending from the working chamber to the reservoir.

The viscous clutch of the preceding paragraph can optionally include, additionally and/or alternatively, any one or more of the following features, configurations and/or additional components:

the pump bore insert can be removably engaged with the rotor assembly;

the pump bore insert can include a threaded shank, a head adjoining the shank, and an engagement structure located on or along at least one of the shank and the head, the bore can extend through the shank and the head;

a wiper engaged at an outer diameter portion of the rotor assembly adjacent to the pump bore insert and extending radially outward from a surrounding surface of the rotor assembly;

the wiper can have a generally rectangular perimeter and be curved;

a fluid return bore that extends radially through at least a portion of the rotor assembly to the working chamber, the fluid return bore forming at least a portion of the fluid return path from the working chamber to the reservoir;

a reservoir cover defining a portion of a boundary of the reservoir; and a flow guide that traverses the reservoir cover to deliver the shear fluid from fluid return bore of the rotor assembly to the reservoir along the fluid return path;

an electromagnetically actuated valve assembly configured to controllably translate a first valve subassembly that controls flow of the shear fluid between the reservoir and the working chamber;

a second valve subassembly configured to be actuated concurrently with the first valve subassembly to further control flow of the shear fluid between the reservoir and the working chamber;

an electromagnetic coil assembly positioned adjacent to the housing assembly, wherein the electromagnetic coil assembly includes first and second windings with separate terminals;

the rotor assembly can include a disk, wherein the fluid return bore extends radially through at least a portion of the disk, and wherein the pump bore insert is positioned at least partially within the fluid return bore;

the rotor assembly can include a bearing hub connected to the disk for co-rotation therewith, wherein the bearing hub extends beyond the housing assembly to provide a mounting location for an output member;

a pulley connected to the housing assembly for co-rotation with the housing assembly;

a rotationally fixed journal bracket having a shaft portion; a first set of tapered roller bearings for rotationally supporting the housing assembly on the shaft portion of the journal bracket; and a second set of tapered roller bearings for rotationally supporting the rotor assembly on the shaft portion of the journal bracket;

an access opening in the housing assembly configured to allow access to the pump bore insert;

the housing assembly can include a base supported by bearings; and a cover attached to the base, wherein the access opening extends through a portion of the base;

the pump bore insert can be removable through the access opening while the cover is attached to the base; and/or a plug removably engaged with the access opening.

Further, a kit for use with the viscous clutch described above can include a replacement pump bore insert of a different configuration, such as having a bore of a different size.

A method for using a viscous clutch can include engaging a first pump bore insert along a working chamber of the viscous clutch at a fluid return bore; and replacing the first pump bore insert with a second pump bore insert of a different configuration.

The method of the preceding paragraph can optionally include, additionally and/or alternatively, any one or more of the following steps, features, and/or configurations:

the first and second pump bore inserts can each, respectively, be positioned at least partially within a radially extending portion of a fluid return bore along a fluid return path;

inserting a tool through an access opening in a housing assembly of the viscous clutch; and engaging the tool with the first pump bore insert;

removing the first pump bore insert from the viscous clutch;

the replacement second pump bore insert can provide different pumping characteristics to the viscous clutch than the removed first pump bore insert; and/or positioning a removable wiper to protrude radially into the working chamber, wherein the removable wiper is positioned adjacent to the pump bore insert.

A method for use with a viscous clutch can include positioning a first pump bore insert along a working chamber of the viscous clutch and at least partially within a fluid return bore; removing the first pump bore insert from the viscous clutch; and positioning a second pump bore insert along the working chamber of the viscous clutch and at least partially within the fluid return bore in place of the first pump bore insert.

The method of the preceding paragraph can optionally include, additionally and/or alternatively, any one or more of the following steps, features, and/or configurations:

positioning a removable wiper to protrude into the working chamber, wherein the removable wiper is positioned adjacent to the pump bore insert; and removing the removable wiper from the viscous clutch;

the second pump bore insert can have a differently sized bore than the first pump bore insert; and/or metering shear fluid flow with the first or second pump bore insert.

A method for a viscous clutch can include pumping shear fluid through a bore having a first diameter; and reconfiguring the bore to have a second diameter different from the first diameter.

SUMMATION

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

Although the present invention has been described with reference to preferred embodiments, workers skilled in the art will recognize that changes may be made in form and detail without departing from the spirit and scope of the invention. For example, the interchangeable pump bore insert 60 and the wiper 63 disclosed above can each be used in nearly any type of viscous clutch. Moreover, the configuration of the fluid paths 48 and 50 described above can be utilized in clutches having any type of desired pumping assembly.

The invention claimed is:

1. A viscous clutch comprising:

*a rotationally fixed journal bracket having a shaft portion;* a housing assembly;

a rotor assembly *that includes a disk and a bearing hub connected to the disk for co-rotation therewith, wherein the bearing hub extends beyond the housing assembly in a direction away from the journal bracket to provide a mounting location for an output member, and wherein the rotor assembly is rotatably supported on the shaft portion*;

a reservoir to hold a supply of a shear fluid, the reservoir carried by the housing assembly;

a reservoir cover defining a portion of a boundary of the reservoir;

a working chamber operatively positioned between the housing assembly and the rotor assembly, wherein selective introduction of the shear fluid to the working chamber facilitates selective torque transmission between the housing assembly and the rotor assembly;

*an electromagnetically actuated valve assembly configured to controllably translate a first valve element that controls flow of the shear fluid between the reservoir and the working chamber;*

*an electromagnetic coil assembly located rearward of the housing assembly, wherein energization of the coil assembly controls translation of the first valve element, wherein the reservoir is located in between the elec-*

*tromagnetic coil assembly and the mounting location for the output member on the bearing hub, and wherein the valve assembly extends from a location adjacent to the electromagnetic coil assembly into the reservoir;* an outlet bore in the reservoir cover to allow the shear fluid out of the reservoir to the working chamber along a fluid delivery path; and a fluid return bore that extends radially through at least an outer diameter portion of the *disk of the* rotor assembly to the working chamber, the fluid return bore forming at least a portion of a fluid return path from the working chamber to the reservoir.

[2. The viscous clutch of claim 1 and further comprising:

an electromagnetically actuated valve assembly configured to controllably translate a first valve element that controls flow of the shear fluid between the reservoir and the working chamber.]

3. The viscous clutch of claim [2] *1* and further comprising:

a second valve element configured to be actuated concurrently with the first valve element to further control flow of the shear fluid between the reservoir and the working chamber*, wherein the first and second valve elements are actuated by a common translating armature*.

4. The viscous clutch of claim 1[and further comprising:

an], *wherein* the electromagnetic coil assembly *is* positioned adjacent to the housing assembly, *and* wherein the electromagnetic coil assembly includes first and second windings each having terminals electrically connectable in a configuration selected from the group consisting of series and parallel, for operation at different voltages.

[5. The viscous clutch of claim 1, wherein the rotor assembly comprises:

a disk, wherein the fluid return bore extends radially through at least a portion of the disk; and a bearing hub connected to the disk for co-rotation therewith, wherein the bearing hub extends beyond the housing assembly to provide a mounting location for an output member.]

6. The viscous clutch of claim 1 and further comprising:

a pulley connected to the housing assembly for co-rotation with the housing assembly.

7. The viscous clutch of claim 1 and further comprising:

[a rotationally fixed journal bracket having a shaft portion;]

a first set of tapered roller bearings for rotationally supporting the housing assembly on the shaft portion of the journal bracket; and a second set of tapered roller bearings for rotationally supporting the rotor assembly on the shaft portion of the journal bracket.

8. The viscous clutch of claim 1, wherein the housing assembly includes a plurality of cooling fins, and wherein the cooling fins are configured to rotate whenever there is a rotational input to the viscous clutch.

9. The viscous clutch of claim 1 and further comprising:

an interchangeable pump bore insert positioned at least partially within the fluid return bore, wherein the interchangeable pump bore insert includes a bore in fluid communication with the fluid return bore.

10. The viscous clutch of claim 9 and further comprising:

an access opening in the housing assembly configured to allow access to the interchangeable pump bore insert.

11. The viscous clutch of claim 1 and further comprising:

a wiper at an outer diameter portion of the rotor assembly and protruding, at least partially, into the working chamber.

12. The viscous clutch of claim 11, wherein the wiper is removably attached to [a] *the* disk of the rotor assembly.

13. The viscous clutch of claim 1 and further comprising:

a flow guide that traverses the reservoir cover to deliver the shear fluid from *the* fluid return bore of the rotor assembly to the reservoir along the fluid return path.

14. The viscous clutch of claim 1 and further comprising:

[a bearing hub connected to the disk for co-rotation therewith, wherein the bearing hub extends beyond the housing assembly to provide a mounting location for an output member;

a rotationally fixed journal bracket having a shaft portion, wherein the bearing hub extends beyond the housing assembly in a direction away from the journal bracket;]

a first bearing set for rotationally supporting the housing assembly on the shaft portion of the journal bracket; and a second bearing set for rotationally supporting the rotor assembly on the shaft portion of the journal bracket.

15. A method for selective torque transmission, the method comprising:

delivering a rotational input to a housing assembly that carries a reservoir;

*rotating the housing assembly on a rotationally fixed mounting shaft with a first bearing set, wherein the first bearing set is located radially inward from the reservoir;* selectively delivering a shear fluid to a working chamber along a fluid delivery path extending from the reservoir to the working chamber, wherein the fluid delivery path extends through an outlet bore along a boundary of the reservoir;

transmitting torque to a rotor assembly as a function of volume of the shear fluid selectively delivered to the working chamber;

*rotating the rotor assembly on the rotationally fixed mounting shaft with a second bearing set;* and returning the shear fluid from the working chamber to the reservoir along a fluid return path that extends through a substantially radial bore through a disk of the rotor assembly.

16. The method of claim 15 and further comprising:

providing a first interchangeable pump bore insert to provide pumping at a first rate when returning the shear fluid from the working chamber to the reservoir.

17. The method of claim 16 and further comprising:

replacing the first interchangeable pump bore insert having a bore of a first size with a second interchangeable pump bore insert having a bore of a second size that is different from the first size.

18. The method of claim 15 and further comprising:

securing a *removably attached* wiper to an outer diameter portion of the disk adjacent to the substantially radial bore such that the wiper protrudes into the working chamber.

[19. A viscous clutch comprising:

a housing assembly;

a rotor assembly;

a reservoir to hold a supply of a shear fluid;

a working chamber operatively positioned between the housing assembly and the rotor assembly, wherein selective introduction of the shear fluid to the working chamber facilitates selective torque transmission between the housing assembly and the rotor assembly;

a fluid return bore that extends radially through at least an outer diameter portion of the rotor assembly to the working chamber, the fluid return bore forming at least a portion of a fluid return path from the working chamber to the reservoir;

an interchangeable pump bore insert positioned at least partially within the fluid return bore, wherein the interchangeable pump bore insert includes a bore in fluid communication with the fluid return bore; and an access opening in the housing assembly configured to allow access to the interchangeable pump bore insert.]

[20. A viscous clutch comprising:

a housing assembly;

a rotor assembly including a disk;

a reservoir to hold a supply of a shear fluid;

a working chamber operatively positioned between the housing assembly and the rotor assembly, wherein selective introduction of the shear fluid to the working chamber facilitates selective torque transmission between the housing assembly and the rotor assembly;

a fluid return bore that extends radially through at least an outer diameter portion of the rotor assembly to the working chamber, the fluid return bore forming at least a portion of a fluid return path from the working chamber to the reservoir; and a wiper at an outer diameter portion of the rotor assembly and protruding, at least partially, into the working chamber, wherein the wiper is removably attached to the disk of the rotor assembly.]

*21. A viscous clutch comprising:*

*a rotationally fixed shaft;*

*an input assembly rotationally mounted on the shaft;*

*an output assembly rotationally mounted on the shaft, wherein the output assembly includes a disk and a bearing hub connected to the disk for co-rotation therewith, wherein the bearing hub extends beyond a front of the input assembly to provide a forward-facing mounting surface;*

*a reservoir to hold a supply of a shear fluid, the reservoir carried by the input assembly;*

*a reservoir cover attached to the input assembly, the reservoir cover defining a portion of a boundary of the reservoir;*

*a working chamber operatively positioned between the input assembly and the disk of the output assembly;*

*an outlet bore in the reservoir cover to allow the shear fluid out of the reservoir to the working chamber along a fluid delivery path;*

*an additional outlet bore in the reservoir cover to further allow the shear fluid out of the reservoir to the working chamber along the fluid delivery path;*

*an electromagnetically actuated valve assembly including:*

*a first valve element that controls flow of the shear fluid between the reservoir and the working chamber through the outlet bore;*

*a second valve element that further controls flow of the shear fluid between the reservoir and the working chamber through the additional outlet bore;*

*a first axially-extending rod that passes through a first rod opening in the input assembly and that engages the first valve element;*

*a second axially-extending rod that passes through a second rod opening in the input assembly and that engages the second valve element; and*

*a translating armature located rearward of the disk and secured to both the first and second axially-extending rods, such that the first and second valve elements are actuatable concurrently in response to magnetic flux applied to the translating armature; and*

*a fluid return bore that extends radially through at least an outer diameter portion of the disk of the output assembly to the working chamber, the fluid return bore forming at least a portion of a fluid return path from the working chamber to the reservoir.*

* * * * *